UNITED STATES PATENT OFFICE 2,193,652

ACCELERATOR OF VULCANIZATION

Waldo L. Semon, Silver Lake, Ohio, assignor to The B. F. Goodrich Company, New York, N. Y., a corporation of New York No Drawing. Application September 15, 1937, Serial No. 163,987

13 Claims. (Cl. 260—793)

This invention relates to the art of rubber manufacture and has as its chief object to provide a new and improved class of accelerators of vulcanization.

Derivatives of dithiocarbamic acids were among the first known organic accelerators. The dialkyl dithiocarbamates which were first prepared were thought to be very useful, since they are so active that they are capable of inducing vulcanization of rubber even at room temperatures. It was soon discovered, however, that this property was a great disadvantage, since the rubber prevulcanized or "scorched" while it was being mixed, calendered, extruded, or even while it was being stored prior to vulcanization, making such accelerators practically useless for compounding in rubber on an industrial scale. This uncontrollability resulted in a search for less active materials. Derivatives of mono-aryl and alkyl-aryl dithiocarbamic acids have been proposed as accelerators, but they too are somewhat unstable and, in some cases, even more active than the dialkyl compounds.

In the process of this invention, the vulcanization of rubber is accelerated by the condensation products of aliphatic aldehydes and a diaryl dithiocarbamic acid. For example, formaldehyde, acetaldehyde, propionaldehyde, butyraldehyde, acrolein, etc., enter into condensation reactions with diphenyl dithiocarbamic acid and the similar ditolyl (ortho, meta, para or mixed), dinaphthyl (alpha, beta or mixed), dixenyl, phenylnaphthyl, phenyl-xenyl, phenyl-cumyl, phenyl-p - isopropenylphenyl, p-allylphenyl-beta-naphthyl, phenyl-p-isopropoxyphenyl, phenyl-p-hydroxyphenyl, phenyl-p-phenyloxyphenyl, di-o-anisyl, phenyl-p-chlorphenyl, phenyl-m-bromphenyl, phenyl-p-dimethylaminophenyl, phenyl-p-methylaminophenyl, phenyl-p-anilinophenyl, phenyl - p-nitrophenyl, phenyl - p - acetylamidophenyl, or other like diaryl dithiocarbamic acids, to form resinous materials which are excellent accelerators of vulcanization. The term aryl is therefore to be understood as designating both unsubstituted and substituted monovalent radicals containing an aromatic carbocyclic ring with the free valence on a nuclear carbon atom unless it is specifically limited to aryl hydrocarbon groups, but as excluding cyclic groups which are not aromatic in character such as cycloaliphatic groups. The diarylarylene bis dithiocarbamic acids such as diphenylphenylene bis dithiocarbamic acid are also included in the generic term diaryl dithiocarbamic acid.

These resinous products may be made by simply mixing equimolar proportions of a free diaryl dithiocarbamic acid and an aliphatic aldehyde. In practice, however, I prefer to use an excess of formaldehyde and to heat the reaction mixture at from 50–75° C. for from 20 minutes to an hour or more. If desired, I may use a metal diaryl dithiocarbamate, sodium diphenyl dithiocarbamate for instance, as a starting material, precipitate the free acid by acidifying the dithiocarbamate solution, and add the aldehyde directly without separating the free acid. The properties of products of the reaction will naturally vary somewhat with the reactants used. In general, amorphous, doughy masses which harden, upon cooling, to form resinous solids, are formed. These resinous solids may be separated from the reaction mixture and heated further at a temperature above 100° C. to form translucent, friable resins having about the same accelerating power. The chemical composition of the resins has not been definitely determined but the nature of the products indicates that they are long-chain condensation products similar to those often formed by aldehyde condensations.

As a specific example of one embodiment of my invention, I prepare condensation product of formaldehyde and phenyl-beta-naphthyl dithiocarbamic acid and employ it to accelerate the vulcanization of rubber. 295 grams of pure recrystallized phenyl-beta-naphthyl dithiocarbamic acid (M. P. 143° C.) is suspended in water, 80 c. c of 40% formalin solution is added, and the mixture is heated at 55–75° C. for 20–40 minutes. The product is a yellow oily mass which hardens on cooling, to a hard, brittle, amorphous solid.

A rubber composition is prepared by mixing rubber 100 parts by weight, zinc oxide 5 parts, stearic acid 1 part, sulfur 3.5 parts, and the condensation product prepared as described above 0.5 part. When this composition is cured for 30 minutes at 240° F. a well cured product having a tensile strength of 4100 lbs. per sq. in. is formed.

It is to be understood that the specific examples given above are merely illustrations of one manner of use of the accelerators of this invention; that other accelerators within the scope of the class herein defined may be substituted for the specific compounds used in the examples; that the accelerators of this invention may be used to vulcanize rubber broadly, including caoutchouc, balata, gutta-percha or synthetic rubber; that the accelerators may be incorporated in the rubber by mastication, milling, or other suitable methods; that the accelerators may be used in admixture with each other or other known accelerators, or with antioxidants, organic acids, amines, softeners, pigments, fillers, etc.; and that the rubber may be vulcanized with the assistance of this new class of accelerators in other manners than that particularly set forth above; specifically, it may be vulcanized in hot air, steam, hot water, etc. The accelerators of this invention may advantageously be used in as low a proportion as 0.1% of the rubber in the composition, in which case 3 or 4% of sulfur is generally required, or as high as 5%, with a much reduced quantity of sulfur.

The scope of this invention is accordingly not to be limited to the specific examples herein set forth, but it is to be limited only as required by the prior art and as indicated in the appended claims.

I claim:

1. The process which comprises vulcanizing rubber in the presence of the resinous product obtained by condensing approximately equimolar proportions of an aliphatic aldehyde and a diaryl dithiocarbamic acid.

2. The process which comprises vulcanizing rubber in the presence of the resinous product obtained by condensing approximately equimolar proportions of formaldehyde and a diaryl dithiocarbamic caid.

3. The process which comprises vulcanizing rubber in the presence of the resinous product obtained by condensing approximately equimolar proportions of formaldehyde and a phenylaryl dithiocarbamic acid.

4. The process which comprises vulcanizing rubber in the presence of the resinous product obtained by condensing approximately equimolar proportions of formaldehyde and diphenyl dithiocarbamic acid.

5. The process which comprises vulcanizing rubber in the presence of the resinous condensation product obtained by condensing approximately equimolar proportions of formaldehyde and phenyl-alpha-naphthyl dithiocarbamic acid.

6. The process which comprises vulcanizing rubber in the presence of the resinous condensation product obtained by condensing approximately equimolar proportions of formaldehyde and phenyl-beta-naphthyl dithiocarbamic acid.

7. The process which comprises heating a mixture of rubber, sulfur, and the resinous condensation product obtained by condensing an aliphatic aldehyde and a diaryl dithiocarbamic acid.

8. The process which comprises vulcanizing rubber in the presence of the resinous product obtained by condensing an aliphatic aldehyde and a diaryl dithiocarbamic acid.

9. An unvulcanized rubber composition containing rubber, a vulcanizing agent, and the resinous product obtained by condensing an aliphatic aldehyde and a diaryl dithiocarbamic acid.

10. An unvulcanized rubber composition containing rubber, a vulcanizing agent, and the resinous product obtained by condensing formaldehyde and a diaryl dithiocarbamic acid.

11. An unvulcanized rubber composition containing rubber, a vulcanizing agent, and the resinous product obtained by condensing approximately equimolar proportions of formaldehyde and diphenyl dithiocarbamic acid.

12. An unvulcanized rubber composition containing rubber, a vulcanizing agent, and the resinous product obtained by condensing approximately equimolar proportions of formaldehyde and phenyl-alpha naphthyl dithiocarbamic acid.

13. An unvulcanized rubber composition containing rubber, a vulcanizing agent, and the resinous product obtained by condensing approximately equimolar proportions of formaldehyde and phenyl-beta-naphthyl dithiocarbamic acid.

WALDO L. SEMON.